(12) United States Patent
Hwang

(10) Patent No.: US 9,166,430 B2
(45) Date of Patent: *Oct. 20, 2015

(54) BATTERY CHARGE CIRCUIT

(75) Inventor: Kyu Min Hwang, Gwangju (KR)

(73) Assignee: Green Powerset Co., LTD., Seoul (KR)

( * ) Notice: Subject to any disclaimer, the term of this patent is extended or adjusted under 35 U.S.C. 154(b) by 344 days.

This patent is subject to a terminal disclaimer.

(21) Appl. No.: 13/593,694

(22) Filed: Aug. 24, 2012

(65) Prior Publication Data

US 2013/0221899 A1  Aug. 29, 2013

(30) Foreign Application Priority Data

Aug. 24, 2011  (KR) .................. 10-2011-0084499
Aug. 29, 2011  (KR) .................. 10-2011-0086735

(51) Int. Cl.
*H02J 7/00* (2006.01)
*H02J 1/00* (2006.01)

(52) U.S. Cl.
CPC .............. *H02J 7/0052* (2013.01); *H02J 7/0013* (2013.01); *H02J 2001/004* (2013.01)

(58) Field of Classification Search
CPC ......... H02J 7/0052; H02J 7/008; H02J 7/045; H02J 7/052; H02J 7/0013; H02J 2001/004; B60L 11/185; Y02T 10/705; Y02T 10/7241; Y02T 90/121; Y02T 90/127; Y02T 90/18
USPC .......................... 320/106, 107, 140, 152, 153
See application file for complete search history.

(56) References Cited

U.S. PATENT DOCUMENTS

| 2006/0113930 | A1* | 6/2006 | Andriolo ..................... 318/66 |
| 2008/0136368 | A1* | 6/2008 | Hajiaghajhani ............. 320/106 |
| 2009/0206797 | A1* | 8/2009 | Chueh et al. ................. 320/150 |
| 2011/0006731 | A1* | 1/2011 | Wang et al. .................. 320/109 |
| 2011/0115435 | A1* | 5/2011 | Kikuchi ....................... 320/118 |
| 2012/0086399 | A1* | 4/2012 | Choi ............................ 320/116 |

* cited by examiner

*Primary Examiner* — Vuthe Siek
(74) *Attorney, Agent, or Firm* — William Park & Associates Ltd.

(57) ABSTRACT

Provided is a battery charge circuit including a charging power supply unit configured to generate an internal voltage using an external power supply; a charging unit configured to measure voltages of a plurality of batteries, output measurement signals, and selectively charge at least one among the plurality of batteries in response to charge control signals; and a control unit configured to select charging methods corresponding to the measurement signals, and generate the control signals corresponding to the charging methods.

19 Claims, 3 Drawing Sheets a: ANODE
b: CATHODE
c: SOURCE
d: DRAIN

BATTERY CHARGE CIRCUIT

BACKGROUND

1. Field of the Invention

The present invention relates to a charge circuit for a battery pack including a plurality of batteries connected in series, and more particularly, to cell-balancing for equalizing voltages of the plurality of batteries when the battery pack is charged.

2. Discussion of Related Art

When charging and discharging of batteries that are connected in series are repeated, voltages of the batteries become different due to different lifespan of the batteries. When batteries having different voltages are repeatedly charged and discharged, a battery, the performance of which deteriorates to a higher degree than the other batteries is over-discharged or over-charged and is thus accelerated to deteriorate, thereby lowering the performance of a battery pack including the batteries. For effective use of the battery pack, degrees to which the batteries connected in series are charged/discharged should be controlled to be the same. Generally, to this end, the voltages of the batteries are equalized. This process is referred to as cell-balancing. The present invention suggests a method of satisfying such a need.

SUMMARY OF THE INVENTION

The present invention is directed to a battery charge circuit capable of charging a plurality of batteries connected in series to the same voltage, regardless of different characteristics of the plurality of batteries.

According to an aspect of the present invention, there is provided a battery charge circuit including a charging power supply unit configured to generate an internal voltage using an external power supply; a charging unit configured to measure voltages of a plurality of batteries, output measurement signals, and selectively charge at least one among the plurality of batteries in response to charge control signals; and a control unit configured to select charging methods corresponding to the measurement signals, and generate the charge control signals corresponding to the charging methods.

According to another aspect of the present invention, there is provided a battery charge circuit including a charging power supply unit configured to generate an internal voltage using an external power supply; a charging unit configured to measure voltages of first to third batteries, output measurement signals, and selectively charge at least one among the first to third batteries in response to charge control signals; and a control unit configured to select charging methods corresponding to the measurement signals among a plurality of charging methods stored therein, and generate the charge control signals corresponding to the selected charging methods.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
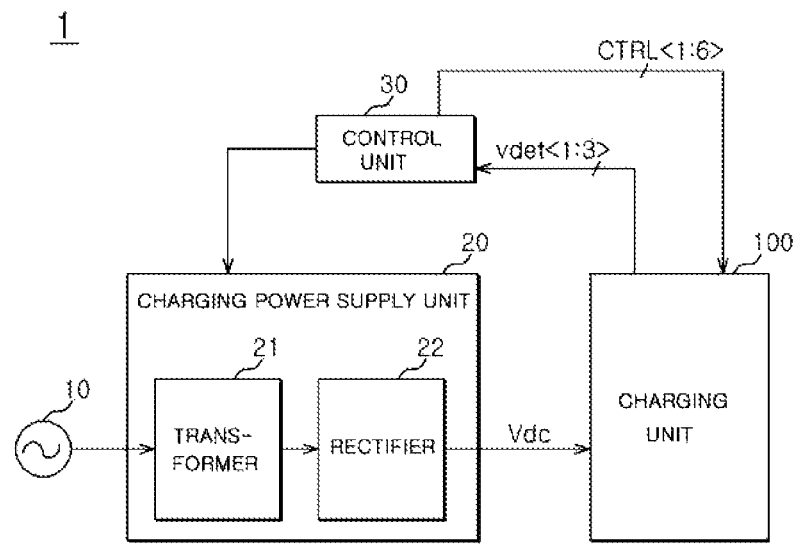
FIG. 1 is a block diagram of a battery charge circuit according to an exemplary embodiment of the present invention.

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention. Like reference numerals denote like elements throughout the drawings.

Referring to FIG. 1, a battery charge circuit 1 according to an exemplary embodiment of the present invention includes a charging power supply unit 20, a charging unit 100, and a control unit 30.

The charging power supply unit 20 is configured to generate an internal direct current (DC) voltage Vdc for charging by using an external alternate current (AC) voltage supply unit 10.

The charging power supply unit 20 includes a transformer 21 and a rectifier 22.

The transformer 21 is configured to transform a voltage of the external AC voltage power supply 10 into a voltage for battery charging.

The rectifier 22 is configured to rectify an output of the transformer 21, and generate an internal DC voltage Vdc.

A circuit of the charging unit 100 is configured based on a plurality of batteries (three batteries E1 to E3 in the current embodiment of FIG. 1) mounted therein.

The charging unit 100 measures voltages of the plurality of batteries E1 to E3, outputs measurement signals Vdet<1:3>, and begins charging of the plurality of batteries E1 to E3 such that the plurality of batteries E1 to E3 have the same voltage, according to charging modes corresponding to charge control signals CTRL<1:6>.

The charging unit 100 may selectively charge the plurality of batteries E1 to E3 in response to the charge control signals CTRL<1:6>.

The charging unit 100 may charge another battery using at least one among the plurality of batteries E1 to E3, or may charge all or some of the plurality of batteries E1 to E3 using the internal DC voltage Vdc, in response to the charge control signals CTRL<1:6>.

The control unit 30 is configured to generate the charge control signals CTRL<1:6> in response to the measurement signals Vdet<1:3>.

The control unit 30 may include a micro controller unit (MCU).

Charging modes corresponding to the voltages of the plurality of batteries E1 to E3 are programmed in the MCU of the control unit 30. Thus, the control unit 30 determines the voltages of the plurality of batteries E1 to E3 and charging modes corresponding to the voltages of the plurality of batteries E1 to E3 in response to the measurement signals Vdet<1:3>, and outputs the charge control signals CTRL<1:6> corresponding to the determined charging modes to the charging unit 100.

Figure 2:
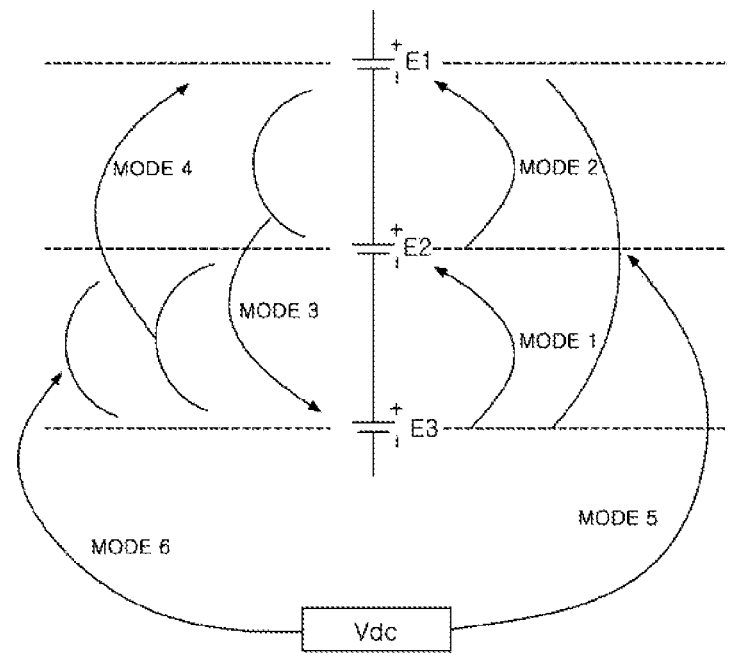
FIG. 2 is a diagram illustrating charging modes according to an exemplary embodiment of the present invention.

FIG. 2 is a diagram illustrating charging modes according to an exemplary embodiment of the present invention.

First, the current embodiment is directed to balancing between a plurality of batteries E1 to E3, i.e., equalizing charging voltages of the plurality of batteries E1 to E3.

To this end, a battery having a higher or lower voltage among the plurality of batteries E1 to E3 should be equalized with voltages of the other batteries.

Thus, as illustrated in FIG. 2, according to the current embodiment, various charging modes, e.g., modes 1 to 6, may be selectively used based on the plurality of batteries E1 to E3.

In mode 1, the battery E2 is charged using the battery E3.
In mode 2, the battery E1 is charged using the battery E2.
In mode 3, the battery E3 is charged using the batteries E1 and E2.
In mode 4, the battery E1 is charged using the batteries E2 and E3.
In mode 5, all of the batteries E1, E2, and E3 are charged using an internal DC voltage Vdc.
In mode 6, the batteries E2 and E3 are charged using the internal DC voltage Vdc.

On the other hand, there are a number of cases of the differences between voltage characteristics of the plurality of batteries E1 to E3. Accordingly, according to an embodiment of the present invention, voltages of all of the batteries may be equalized using a charging method obtained from a selective combination of at least one mode among the charging modes described above, for each of the number of cases.

In other words, a plurality of charging methods, i.e., charging methods corresponding to the number of cases, are stored in the MCU of the control unit 30.

A number of cases of the differences between voltage characteristics of the plurality of batteries E1 to E3 (Case 0 to Case 12) and charging methods corresponding to Case 0 to Case 12 is listed below.

For convenience of explanation, the plurality of batteries E1 to E3 will be referred to as a first battery E1, a second battery E2, and a third battery E3, respectively, and the voltage characteristics of the first to third batteries E1 to E3 will be identified as being large, medium, and small. The control unit 30 is set to determine the voltage characteristics of the first to third batteries E1 to E3 as large, medium, and small, in response to measurement signals Vdet<1:3>.

Case 0 (large, large, large, or small, small, small)
Voltages of the first to third batteries E1 to E3 are equalized with the voltage of another battery charge circuit set (hereinafter referred to as 'module') according to mode 5.

Case 1 (large, large, small)
① The voltage of the third battery E3 is equalized with those of the first and second batteries E1 and E2 according to mode 3.
② The voltages of the first to third batteries E1 to E3 are equalized with the voltage of another module according to mode 5.

Case 2 (large, small, large)
① The voltage of the second battery E1 is equalized with that of the third battery E3 according to mode 1.
② The second and third batteries E2 and E3 are charged according to mode 6.
③ The voltages of the first to third batteries E1 to E3 are equalized with the voltage of another module according to mode 5.

Case 3 (large, small, small)
① The second and third batteries E2 and E3 are charged according to mode 6.
② The voltages of the first to third batteries E1 to E3 are equalized with the voltage of another module according to mode 5.

Case 4 (small, large, large)
① The voltage of the first battery E1 is equalized with those of the second and third batteries E2 and E3 according to mode 4.
② The voltages of the first to third batteries E1 to E3 are equalized with the voltage of another module according to mode 5.

Case 5 (small, large, small)
① The voltage of the first battery E1 is equalized with that of the second battery E2 according to mode 2.
② The voltage of the third battery E3 is equalized with those of the first and second batteries E1 and E2 according to mode 3.
③ The voltages of the first to third batteries E1 to E3 are equalized with the voltage of another module according to mode 5.

Case 6 (small, small, large)
① The voltage of the second battery E2 is equalized with that of the third battery E3 according to mode 1.
② The voltage of the first battery E1 is equalized with those of the second and third batteries E2 and E3 according to mode 4.
③ The voltages of the first to third batteries E1 to E3 are equalized with the voltage of another module according to mode 5.

Case 7 (large, medium, small)
① The voltage of the third battery E3 is equalized with that of the second battery E2 according to mode 3.
② The second and third batteries E2 and E3 are charged according to mode 6 such that the voltages of the second and third batteries E2 and E3 are equalized with the voltage of the first battery E1.
③ The voltages of the first to third batteries E1 to E3 are equalized with the voltage of another module according to mode 5.

Case 8 (large, small, medium)
① The voltage of the second battery E2 is equalized with that of the third battery E3 according to mode 1.
② The second and third batteries E2 and E3 are charged according to mode 6 such that the voltages of the second and third batteries E2 and E3 are equalized with the voltage of the first battery E1.
③ The voltages of the first to third batteries E1 to E3 are equalized with the voltage of another module according to mode 5.

Case 9 (medium, large, small)
① The voltage of the first battery E1 is equalized with that of the second battery E2 according to mode 2.
② The voltage of the third battery E3 is equalized with those of the first and second batteries E1 and E2 according to mode 3.
③ The voltages of the first to third batteries E1 to E3 are equalized with the voltage of another module according to mode 5.

Case 10 (medium, small, large)
① The voltage of the second battery E2 is equalized with that of the third battery E3 according to mode 1.
② The voltage of the first battery E1 is equalized with those of the second and third batteries E2 and E3 according to mode 4.
③ The voltages of the first to third batteries E1 to E3 are equalized with the voltage of another module according to mode 5.

Case 11 (small, medium, large)
① The voltage of the second battery E2 is equalized with that of the third battery E3 according to mode 1.

② The voltage of the first battery E1 is equalized with those of the second and third batteries E2 and E3 according to mode 4.

③ The voltages of the first to third batteries E1 to E3 are equalized with the voltage of another module according to mode 5.

Case 12 (small, large, medium)

① The voltage of the first battery E1 is equalized with that of the second battery E2 according to mode 2.

② The voltage of the third battery E3 is equalized with those of the first and second batteries E1 and E2 according to mode 3.

③ The voltages of the first to third batteries E1 to E3 are equalized with the voltage of another module according to mode 5.

Accordingly, according to the current embodiment, referring back to FIG. 1, the control unit 30 measures the voltages of the plurality of batteries E1 to E3 in response to the measurement signals Vdet<1:3>, and controls the charging unit 100 to operate according to charging methods according to the number of cases described above (Case 0 to Case 12), thereby charging the plurality of batteries E1 to E3 to the same voltage.

Figure 3:
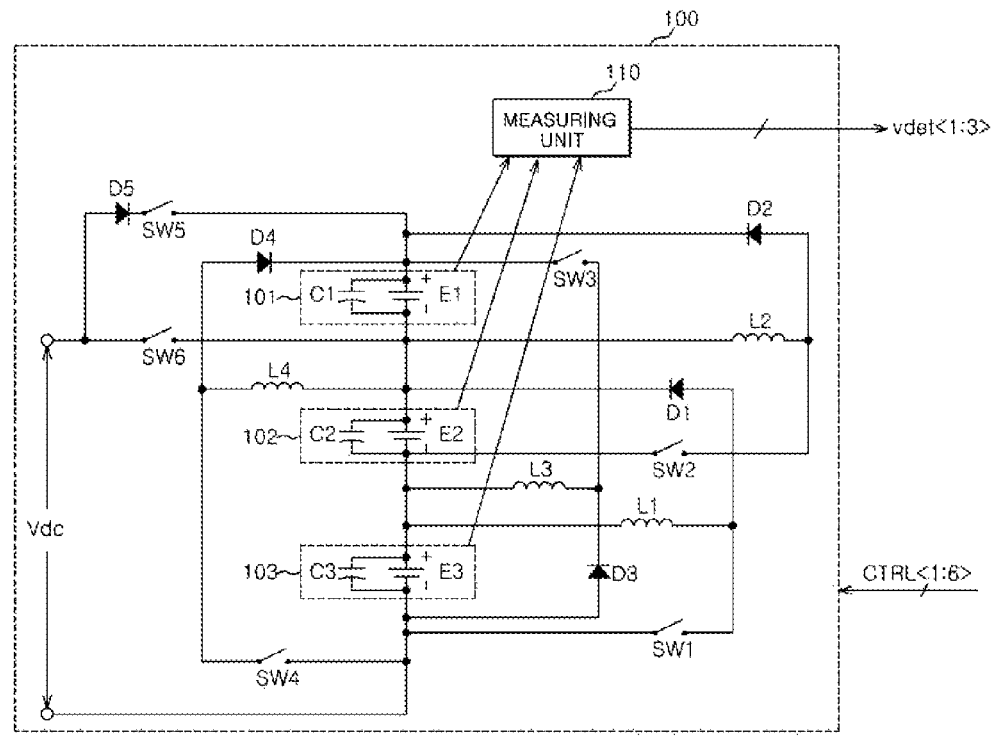
FIG. 3 is a circuit diagram of a charging unit of FIG. 1.

FIG. 3 is a circuit diagram of the charging unit 100 of FIG. 1.

Referring to FIG. 3, the charging unit 100 includes a plurality of charging cells 101 to 103, a measuring unit 110, and circuits for performing a plurality of charging modes.

The plurality of charging cells 101 to 103 include a plurality of batteries E1 to E3 and a plurality of capacitors C1 to C3.

The plurality of capacitors C1 to C3 are respectively connected to the plurality of batteries E1 to E3 so as to remove a smoothing effect, i.e., ripple current.

The measuring unit 110 is configured to measure voltages of the plurality of batteries E1 to E3, and generate measurement signals Vdet<1:3>. The measuring unit 110 may be embodied as an analog-to-digital converter (ADC). Thus, the measuring unit 110 transforms analog voltages of the plurality of batteries E1 to E3 into the measurement signals Vdet<1:3> in the form of digital values.

In this case, each of the measurement signals Vdet<1:3> may consist of at least two bits. For example, the measurement signal Vdet<1> may consist of at least two bits. As described above, since each of the measurement signals Vdet<1:3> consists of at least two bits, charging voltages of the plurality of batteries E1 to E3 may thus be divided according to a plurality of operations.

The plurality of charging modes are performed using a plurality of switches SW1 to SW6, a plurality of diodes D1 to D5, and a plurality of inductors L1 to L4.

Among the plurality of charging modes, a first charging mode is performed using the switch SW1, the diode D1, and the inductor L1.

A second charging mode is performed using the switch SW2, the diode D2, and the inductor L2.

A third charging mode is performed using the switch SW3, the diode D3, and the inductor L3.

A fourth charging mode is performed using the switch SW4, the diode D4, and the inductor L4.

A fifth charging mode is performed using the switch SW5 and the diode D5.

A sixth charging mode is performed using the switch SW6.

The plurality of switches SW1 to SW6 are controlled by the charge control signals CTRL<1:6>. In this case, the plurality of switches SW1 to SW6 are controlled by the charge control signals CTRL<1:6>, respectively. That is, the switch SW1 is controlled by the charge control signal CTRL<1>, the switch SW2 is controlled by the charge control signal CTRL<2>, and the switch SW6 is controlled by the charge control signal CTRL<6>.

Figure 4:
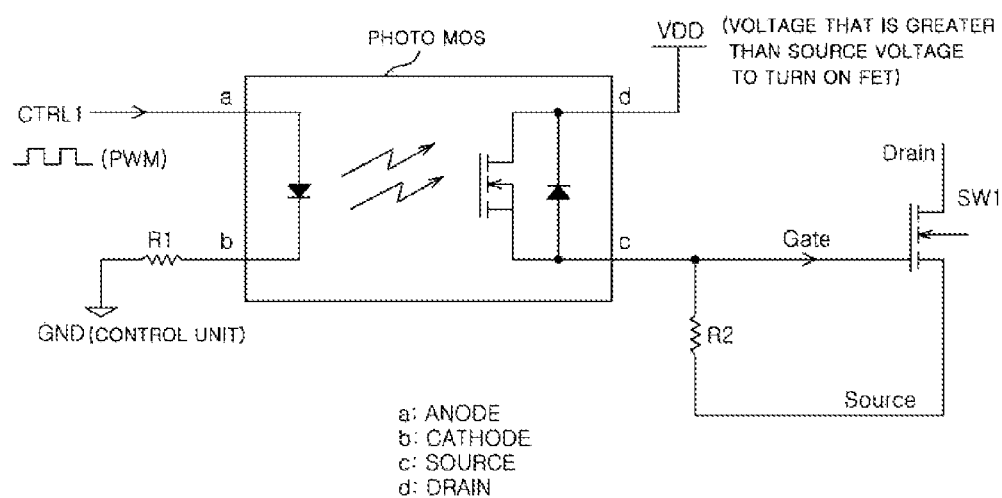
FIG. 4 is a circuit diagram of a control signal driver according to an exemplary embodiment of the present invention.

FIG. 4 is a circuit diagram of a control signal driver according to an exemplary embodiment of the present invention.

The plurality of switches SW1 to SW6 may be configured using various switching devices, e.g., field effect transistors (FETs).

When the plurality of switches SW1 to SW6 are configured using FETs, electric potentials for controlling the FETs may be different from those of the charge control signals CTRL<1:6>. Thus, a driver is required to supply the charge control signals CTRL<1:6> to the FETs. An example of a circuit using a photo metal-oxide semiconductor (MOS), which is a type of optical switching device, as a driver for controlling the switch SW1, is illustrated in FIG. 4.

Alternatively, any of various other optical switching devices, e.g., a photo coupler, may be used instead of the photo MOS.

The control signals CTRL<1:6> may be pulse width modulation (PWM)-based pulse signals (hereinafter referred to as 'PWM pulse signals').

As illustrated in FIG. 4, one end of the photo MOS facing a light-emitting device (not shown) is connected between an output terminal of the control unit 30 via which the charge control signal CTRL<1> is output and a ground terminal GND of the control unit 30, and another end of the photo MOS facing a light-receiving device (not shown) is connected between a power supply voltage terminal VDD and a gate terminal of the switch SW1.

Figure 5:
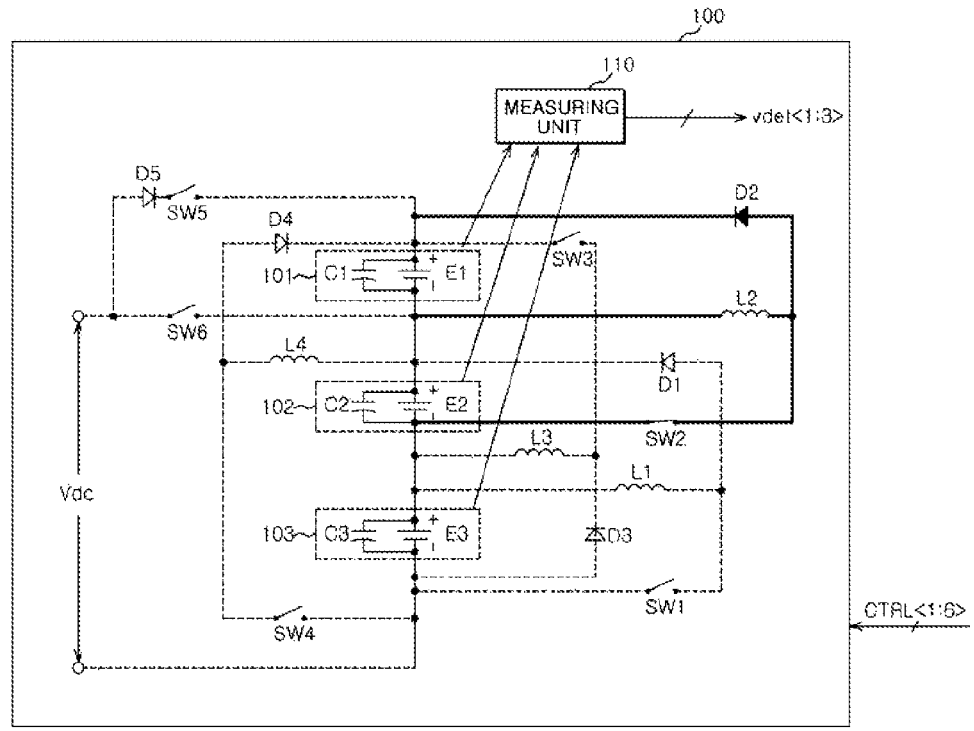
FIGS. 5 and 6 are circuit diagrams illustrating operations of a battery charge circuit in charging mode according to exemplary embodiments of the present invention.
Figure 6:
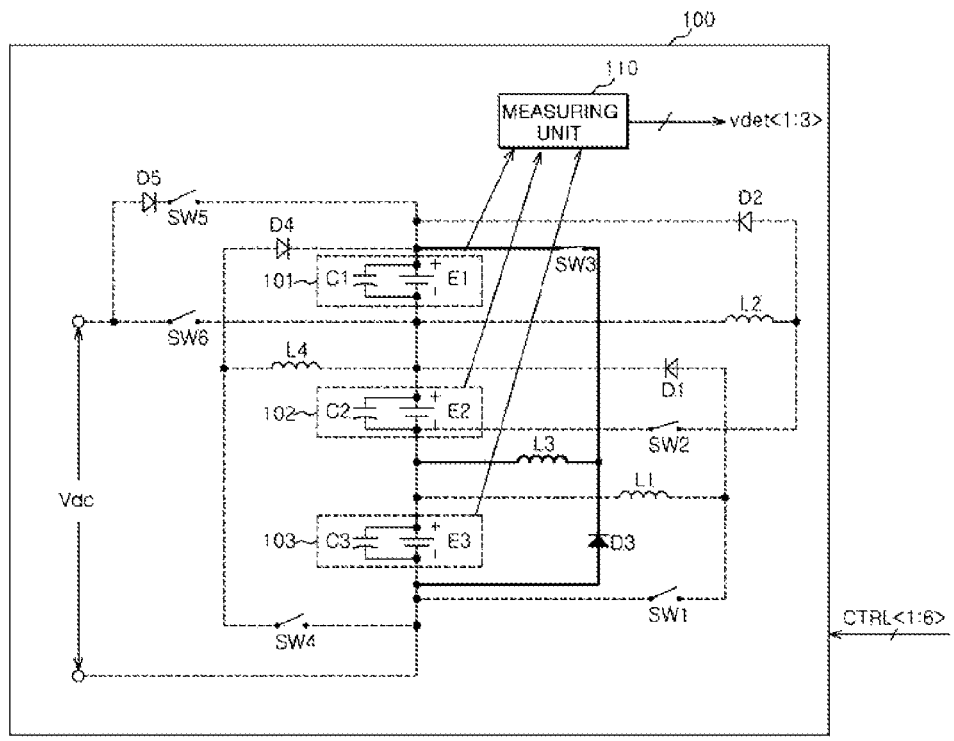

FIGS. 5 and 6 are circuit diagrams illustrating operations of the battery charge circuit 1 of FIG. 1 in charging mode according to exemplary embodiments of the present invention.

FIG. 5 illustrates mode 2 among various charging modes. In FIG. 5, solid lines indicate circuits and devices for performing mode 2.

When mode 2 is selected as illustrated in FIG. 5, a switch SW2 is repeatedly turned on and off in response to a control signal CTRL<2> that is a PWM pulse signal.

While the switch SW2 is turned on, current of a battery E2 is stored in an inductor L2 in the form of magnetic energy.

Then, when the switch SW2 is turned off, the magnetic energy stored in the inductor L2 is transformed into electrical energy, i.e., current, and a battery E1 is charged with the electrical energy via a diode D2.

FIG. 6 illustrates mode 3 among various charging modes. In FIG. 6, solid lines indicate circuits and devices for performing mode 3.

When mode 3 is selected as illustrated in FIG. 6, a switch SW3 is repeatedly turned on and off in response to a control signal CTRL<3> that is a PWM pulse signal.

While the switch SW3 is turned on, current of two batteries E1 and E2 is stored in an inductor L3 in the form of magnetic energy.

Then, when the switch SW3 is turned off, the magnetic energy stored in the inductor L3 is transformed into electrical energy, i.e., current, and a battery E3 is charged with the electrical energy via a diode D3.

There is a case in which standards for a commercial monitoring chip for measuring voltage in a battery management system (BMS) are determined based on twelve batteries.

A battery charge circuit according to an exemplary embodiment of the present invention is designed based on three batteries, and thus may be efficiently applied to the BMS.

According to the above embodiments, a plurality of batteries that are connected in series may be selectively charged, and all of the plurality of batteries may thus be charged to the same voltage, thereby increasing battery efficiency.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents. The exemplary embodiments set forth herein should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A battery charge circuit comprising:
   a charging power supply unit configured to generate an internal voltage using an external power supply;
   a charging unit configured to measure voltages of a plurality of batteries, output measurement signals, and selectively charge at least one among the plurality of batteries in response to charge control signals; and
   a control unit configured to select one of a plurality of charging methods corresponding to a detected one of a plurality of different combinations of voltage levels of the batteries indicated by the measurement signals, and generate the charge control signals corresponding to the selected charging method,
   wherein the control unit stores the plurality of charging methods, each charging method indicating at least some of a plurality of charging modes for the batteries to be executed.

2. The battery charge circuit of claim 1, wherein the charging unit comprises:
   a measuring unit configured to measure the voltages of the plurality of batteries and generate the measurement signals; and
   circuits configured to be selectively connected to the plurality of batteries in response to the charge control signals, to configure the plurality of charging modes for the batteries.

3. The battery charge circuit of claim 2, wherein the measuring unit comprises an analog-to-digital converter (ADC) configured to transform the voltages of the plurality of batteries into the measurement signals in the form of digital signals.

4. The battery charge circuit of claim 2, wherein one of the circuits that configure the charging modes is configured to charge each of the plurality of batteries using at least one among the plurality of batteries.

5. The battery charge circuit of claim 2, wherein one of the circuits that configure the charging modes comprises a switch and an inductor connected between a cathode of one battery and anode of another battery among the plurality of batteries.

6. The battery charge circuit of claim 1, further comprising a driver configured to transmit the charge control signals to the charging unit.

7. The battery charge circuit of claim 6, wherein the driver comprises an optical switching device.

8. The battery charge circuit of claim 1, wherein each one of the charging methods is defined by an execution of some of the charging modes in a predetermined sequence.

9. The battery charge circuit of claim 1, wherein the control unit is configured to provide the charge control signals in the form of pulse width modulation (PWM) signals.

10. The battery charge circuit of claim 1, wherein the charging power supply unit comprises:
    a transformer configured to transform a voltage of the external power supply into a predetermined voltage; and
    a rectifier configured to generate the internal voltage by rectifying an output of the transformer.

11. A battery charge circuit comprising:
    a charging power supply unit configured to generate an internal voltage using an external power supply;
    a charging unit configured to measure voltages of first to third batteries, output measurement signals, and selectively charge at least one among the first to third batteries in response to charge control signals; and
    a control unit configured to select one of a plurality of charging methods corresponding to a detected one of a plurality of different combinations of voltage levels of the first to third batteries indicated by the measurement signals, and generate the charge control signals corresponding to the selected charging method,
    wherein the charging unit comprises:
       a measuring unit configured to measure the voltages of the first to third batteries and generate the measurement signals, and
       circuits configured to be selectively connected to the first to third batteries in response to the charge control signals, to configure a plurality of charging modes for each one of the charging methods.

12. The battery charge circuit of claim 11, wherein
    each one of the charging methods is defined by an execution of some of the charging modes in a predetermined sequence.

13. The battery charge circuit of claim 11, wherein some of the circuits that configure the charging modes are configured to charge another battery using at least one of the first to third batteries.

14. The battery charge circuit of claim 11, wherein some of the circuits that configure the charging modes are configured to charge some or all of the first to third batteries using the internal voltage.

15. The battery charge circuit of claim 11, wherein some of the circuits that configure the charging modes comprise a switch and an inductor connected between a cathode of one battery and an anode of another battery among the first to third batteries.

16. The battery charge circuit of claim 11, further comprising a driver configured to transmit the charge control signals to the charging unit.

17. The battery charge circuit of claim 16, wherein the driver comprises an optical switching device.

18. The battery charge circuit of claim 11, wherein the control unit is configured to provide the charge control signals in the form of pulse width modulation (PWM) signals.

19. The battery charge circuit of claim 11, wherein the plurality of charging modes comprise:
    a first mode in which the second battery is charged using the third battery;
    a second mode in which the first battery is charged using the second battery;
    a third mode in which the third battery is charged using the first and second batteries;
    a fourth mode in which the first battery is charged using the second and third batteries;
    a fifth mode in which the first to third batteries are charged using the internal voltage; and a sixth mode in which the second and third batteries are charged using the internal voltage.

* * * * *